Aug. 1, 1933.    F. W. SPERR, JR    1,920,603
METHOD OF REVIVIFYING FOULED GAS PURIFYING MATERIAL
Filed Oct. 23, 1928
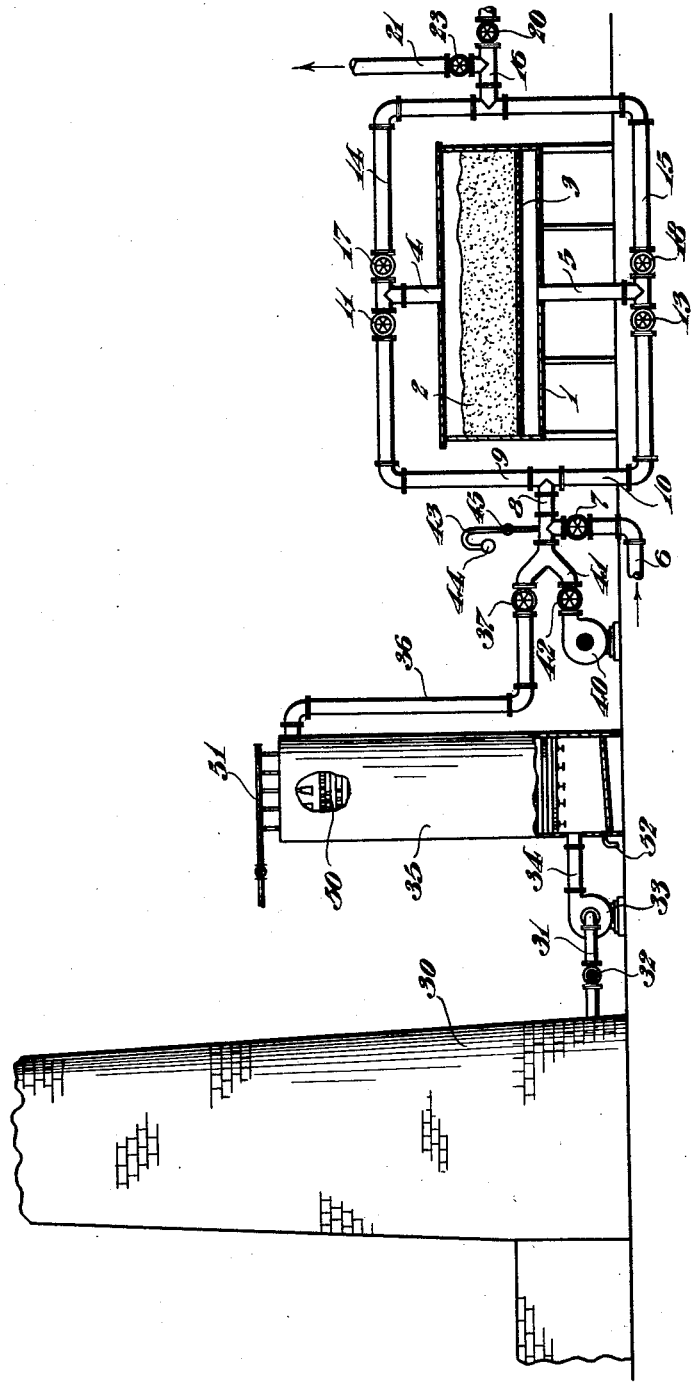
INVENTOR.
Frederick W. Sperr Jr.
BY Jesse R. Langley
ATTORNEY.

Patented Aug. 1, 1933

1,920,603

UNITED STATES PATENT OFFICE 1,920,603

METHOD OF REVIVIFYING FOULED GAS PURIFYING MATERIAL

Frederick W. Sperr, Jr., Pittsburgh, Pa., assignor to The Koppers Company of Delaware, a Corporation of Delaware Application October 23, 1928. Serial No. 314,528

4 Claims. (Cl. 252—2)

My invention relates to the revivification of gas purifying material previously used to remove hydrogen sulphide and analogous acidic impurities from gas, such as fuel gas or the like.

The object of my invention is to provide a method of revivifying such material that shall be advantageous with respect to the methods of the prior art.

The second object of my invention is to enable the operators of a gas purification plant to accomplish the revivification of fouled gas purification material without encountering several serious difficulties and inconveniences which have heretofore inevitably been encountered.

A further object of my invention is to provide a method of accomplishing the revivification of fouled gas purifying material in which the revivification may be controlled to a degree not heretofore possible and resulting in certain improvements with respect to the quality of the revivified material, which have never before been attained without serious inconveniences herein avoided.

My invention has for further objects such other operative advantages or results as may hereinafter be found to obtain.

In the preparation of manufactured gas for consumption as illuminating gas and for other purposes, it is generally necessary or desirable to remove acidic impurities such as hydrogen sulphide, hydrogen cyanide and the like from the gas. The most common method of accomplishing this purification is to pass the gas through a bed of gas purifying material containing as its principal active ingredient an oxide or oxides of iron, usually moist, and generally containing also a considerable amount of inert material such as wood shavings or the like, the inclusion of which tends to promote contact between the gas to be purified and the active purifying agent.

During the course of the gas through this material, the hydrogen sulphide is removed from the gas by reaction with the iron oxide in the presence of moisture to form iron sulphide or sulphides, and the capacity and reactivity of the material is consequently gradually reduced.

The gas purifying material may be used over and over again if it is subsequently or concurrently treated to reoxidize the iron sulphide to iron oxide and sulphur. The gas purifying material may be used repeatedly or over considerable periods if such revivification is practiced, and in fact retains considerable activity until it has accumulated a large amount of free sulphur.

In order to effect oxidation of the iron sulphide present in the gas purifying material, free oxygen has been added to the gas being purified. About 2% of air is ordinarily added to the gas for this purpose. This amount of added oxygen effects a partial oxidation of the iron sulphide. However, after some time, it has been found that the gas purifying material partially revivified in this manner suffers a considerable decrease in its activity and it finally becomes necessary to isolate this material from the gas flow and to revivify it with air alone. Moreover, when revivification is practiced in this manner, the excess oxygen that inevitably remains in the purified gas favors corrosion in the distribution system and service appliances, and may also promote the formation of objectionable gummy deposits.

There are several methods of accomplishing the revivification of the gas purifying material with air alone. According to one method, the "iron oxide box" which contains the material is opened up, the fouled material is removed, and is then spread upon the ground or the floor and exposed to the air. When revivification is accomplished in this manner, it is necessary to turn over the material at frequent intervals so as to obtain efficient oxidation.

The above method is very inconvenient due to the large amount of mechanical labor involved in removing the cover of the box, digging out the material, spreading it out and exposing it to the air, restoring the material to the box and replacing the lid. Consequently other methods have been proposed and attempted for revivifying this material.

According to another method, a stream of air is passed through a gas purification box that has been isolated from the gas stream without removing the material from the box. This method of revivification suffers from the disadvantage that the revivification reactions may go on too rapidly, resulting in dangerous fires and even, where residual gas is present, in explosions and also in the loss of activity in the purifying material due to overheating.

According to the present invention, I overcome the disadvantages of prior methods of effecting revivifications of the fouled gas purifying material without removing it from the purification box by treating it preferably in situ with a regulated mixture of gases low in free oxygen and the remainder comprising non-combustible constituents. By regulating the amounts of free oxygen and inert constituents, the mixture of gases is caused to accomplish revivification of the material without subjecting it to excessive and dangerous temperatures, without destroying the activity of the material and without subjecting the material or apparatus to the danger of fires or explosions.

Preferably the mixture of gases is so regulated that the rise in temperature caused by the oxidation of the material under its influence will be insufficient to bring the temperature of the material being revivified to the ignition point of sulphur, and it is also desirable to additionally limit the amount of oxygen in the gas mixture in order to maintain the temperature of the material being revivified below the melting point of the sulphur or any of the other constituents of the gas purifying material.

As a convenient source of inert gas, I may use the gaseous products of combustion of any suitable fuel, e. g., stack gas or chimney gas, preferably cooled to approximately atmospheric temperature, either with or without the addition of air according to the character thereof, and with or without treatment to remove undesirable constituents and to prevent undue drying out of the gas purification material, as desired.

In order that my invention may be clearly set forth and understood, I now describe, with reference to the accompanying drawing, a preferred manner and form in which my invention may be practiced and embodied, but without limiting it to this illustrative instance. In the drawing, The single figure is an elevational view, more or less diagrammatically represented, of apparatus for purifying gas from acidic constituents and for subsequently effecting the revivification of the material used for that purpose according to the present invention.

Referring to the drawing, the purification of fuel gas is carried out in a box 1 of the usual type that is adapted to contain a body of suitable gas purifying material 2, supported upon a grid 3. The box 1 is provided with connections 4 and 5, either of which may serve as an inlet or outlet and vice versa as conditions require. The fuel gas may be caused to flow either upwardly or downwardly through the gas purifying material 2, as desired. When upward flow is desired, the gas enters the system through a pipe 6, having valve 7, and a pipe 8 with branches 9 and 10, having valves 11 and 13, and communicating with pipes 4 and 5, respectively. The pipes 4 and 5 also communicate with branches 14 and 15 of a pipe 16 and having valves 17 and 18, respectively.

The pipe 16 has a valve 20 and communicates with a vent pipe 21 having a valve 23.

In the present instance valves 11, 18 and 23 are closed and valves 13, 17 and 20 are open. The gas passes through pipes 6, 8, 10 and 5 into the gas purification box, upward through the gas purification material 2 and then through pipes 4, 14 and 16 into the gas distribution system. By suitable manipulation of the valves, i. e., by reversing valves 13, 17, 11 and 18, the direction of the flow of the gas through the gas purification material 2 may be reversed.

When the gas purifying material 2 reaches a point where revivification is necessary or desirable, the valves 7 and 20 are closed and the gas is diverted to other means for purification which may be similar to the unit already described.

Before attempting the revivification of the material, it is desirable to remove combustible gas from the interior of the box 1 in order to prevent explosions or fires. For this purpose, stack gas is drawn from a suitable source 30 through a pipe 31 having valve 32, by means of a blower 33. The stack gas passes through a pipe 34 into a tower 35 where it may be treated for the removal of any undesirable constituents in a manner which will be indicated hereinbelow and then passes into a pipe 36 having a valve 37 and communicating with the pipe 8. The valve 23 is opened and the stack gas is permitted to traverse the box 1 either in an upward or downward direction and may then be allowed to escape into the atmosphere through the vent 21.

Sufficient stack gas is passed through the box 1 in this manner to substantially entirely remove any combustible gas remaining in the box 1 after the purification operation. In this stage of the process at least, it is preferable to employ stack gases as low in free oxygen as can be obtained in order to prevent any combustion from taking place.

After the combustible gas has been driven out of the box 1, the revivification of the material 2 may be accomplished. When stack gas containing limited amounts of free oxygen can be obtained directly from the source 30, such stack gas may be used alone without admixture of free oxygen, but it is often desirable to admix with the stack gas a certain portion of air or other free-oxygen-containing gas in order to affect the desired reoxidation of the material 2.

For this purpose air is drawn from atmosphere by a blower 40 and passes through a pipe 41 having a valve 42 to be admixed with the stack gas in a pipe 8 before entering the box 1.

In order to prevent the drying out of the material 2, I provide a steam line 43 which communicates between a suitable source 44 of steam supply and the pipe 8 and which has a valve 45. By opening the valve 45, steam may be admitted to the box 1 either concurrently with or subsequent to the passage of the revivifying gas therethrough. Steam from this source may also be employed as a purging medium to remove either inert gas or combustible gas from the box 1 at the conclusion of the revivification operation or the purification operation, respectively.

The principal constituent of stack gas which it may be desired to remove before using it for revivification of gas purification material is sulphur dioxide. The tower 35 is provided for removing this constituent as aforesaid and for this purpose is provided with suitable contact filling means 50, suitable sprays 51 for introducing an absorptive liquid, and an outlet 52. The absorption agent used may be any substance which is effective to absorb sulphur dioxide, e. g., ammonia still waste liquor, or milk of lime.

As an alternative mode of procedure, I may employ a tower filled with limestone over which water is circulated. In any case it is desirable to effect a cooling of the hot stack gases in the tower 35 prior to their coming in contact with the gas purification material 2 in order to avoid any rise in temperature of the gas purification material 2 on account of the absorption of sensible heat from the stack gases.

In the event that stack gas is employed without removal of sulphur dioxide therefrom and if on this account an acid condition results in the material 2, a small amount of soda solution or other alkaline liquid may be sprayed over the material 2 in order to maintain it in alkaline condition.

The amount of air and stack gas in the mixture passed into the box 1 may be regulated by the speed of the blowers 33 and 40 and by regulating the valves 37 and 42 in conjunction with the use of suitable meters for measuring the gas.

In general it is desirable to use a gas medium containing sufficient inert non-combustible gas so that the temperature rise caused by the oxidation effected by the free oxygen in the gas mixture will not bring the material 2 to a temperature as high as about 478° F. At this temperature, the sulphur contained in the material 2 would be ignited, which would result in series difficulties and disadvantages.

A further reduction in the amount of free oxygen in the gas mixture and a corresponding increase in the amount of inert constituents is, however, desirable and it is accordingly preferred to regulate the mixture to such an extent that the tempearture of the gas purification material will not be raised to more than 212° F., which is well below the fusion point of the sulphur.

While the theoretical gas mixture which should be employed may be calculated from a consideration of the composition of the purification material 2 and the heats of composition and specific heats of its various constituents by any one skilled in the art, nevertheless the following specific example will serve to illustrate my invention more completely.

A typical iron oxide purification material contains, before contact with the gas to be purified, about 5 lb. of wood shavings, 10.5 lb. of iron oxide, 14.3 lb. of water and 10.2 lb. of aluminum oxide and other inert material, per bushel of total material.

If this material is completely sulphided by using it for the removal of hydrogen sulphide gas and is then revivified by blowing air through it until the iron sulphide formed by contact with the hydrogen sulphide is completely reoxidized to iron oxide, it is found that the temperature of the purifying material will be raised to the neighborhood of 600° F. Such procedure would cause the fusion of a considerable portion if not all of the sulphur present and would also ignite a considerable amount of the sulphur and cause serious difficulties.

In the above instance, the theoretical air requirement for the revivification of 100 lb. of material is about 450 cu. ft. With stack gas cooled to 70° F. and mixed with air in the proportion of 5330 cu. ft. of stack gas to 450 cu. ft. of air, the temperature of the resulting products (solids, liquids and gases) will not be in excess of about 212° F., which is below the melting point of sulphur and which is a temperature sufficiently low to avoid operating difficulties and disadvantages as aforesaid. In the above instance, the stack gas employed contains no free oxygen. When the stack gas does contain a small amount of free oxygen, as shown by analysis, a corresponding reduction in the amount of air required for admixture may be effected, or when sufficient oxygen is present in the stack gas it may be employed without admixing any air therewith.

The length of time required to accomplish the revivification will vary in each instance but may be readily determined by analysis of the gas purifying material, the revivification operation being terminated as soon as the iron sulphide appears to be substantially completely oxidized to iron oxide.

After the revivification is accomplished the inert gas may be removed from the box 2 by steam or by combustible gas and the use of the box in the usual manner for purification of further quantities of gas may be resumed.

My invention is not limited to the employment of stack gas and air, or a mixture thereof, and any other gaseous mixture containing principally inert non-combustible constituents and a limited amount of free oxygen may be employed for this purpose.

While I have described my invention with reference to certain specific examples, it will be understood that my invention is not limited to such illustrative examples, but is to be construed as of the scope of the claims hereinafter made.

I claim as my invention:

1. The method of revivifying spent gas purifying material which comprises subjecting the material to the action of a mixture of gases of combustion of carbonaceous fuel and air in such proportions as to prevent the temperature of the material being revivified from rising to the ignition temperature of the constituents of said material.

2. The method of revivifying spent gas purifying material which comprises subjecting the material to the action of a mixture of stack gas that has previously been treated to remove sulphur dioxide therefrom, and air.

3. The method of revivifying spent gas purifying material which comprises subjecting the material to the action of a mixture of stack gas that has previously been treated to remove sulphur dioxide therefrom, air, and steam.

4. The method of revivifying spent gas purifying material which comprises withdrawing gases of combustion from a source thereof, treating said gases of combustion to remove sulphur dioxide therefrom, mixing a limited amount of air therewith, and passing the mixture of gases through the material to be revivified.

FREDERICK W. SPERR, Jr.